United States Patent
Miller et al.

(10) Patent No.: US 6,624,548 B1
(45) Date of Patent: Sep. 23, 2003

(54) APPARATUS TO POSITION A MICROELECTROMECHANICAL PLATFORM

(75) Inventors: Samuel Lee Miller, Albuquerque, NM (US); Murray Steven Rodgers, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 10 days.

(21) Appl. No.: 09/964,922

(22) Filed: Sep. 26, 2001

(51) Int. Cl.[7] .................... H03H 37/32; H01L 41/08; H02K 33/10
(52) U.S. Cl. .................... 310/307; 310/309; 310/329
(58) Field of Search ................. 310/306, 307, 310/309, 331, 328

(56) References Cited

U.S. PATENT DOCUMENTS

| | | | | |
|---|---|---|---|---|
| 3,304,773 A | * | 2/1967 | Rogallo ...................... | 310/331 |
| 3,526,726 A | * | 9/1970 | Corbett et al. ............... | 310/331 |
| 3,835,338 A | * | 9/1974 | Martin ....................... | 310/331 |
| 4,188,645 A | * | 2/1980 | Ragle et al. .................. | 310/331 |
| 4,686,440 A | * | 8/1987 | Hatamura et al. ........... | 310/328 |
| 5,049,775 A | * | 9/1991 | Smits ......................... | 310/331 |
| 5,089,740 A | * | 2/1992 | Ono ........................... | 310/328 |
| 5,338,997 A | * | 8/1994 | Benecke ..................... | 310/306 |
| 5,962,949 A | | 10/1999 | Dhuler et al. | |
| 6,082,208 A | | 7/2000 | Rodgers et al. | |
| 6,100,534 A | * | 8/2000 | Honma et al. .......... | 310/328 X |
| 6,211,599 B1 | | 4/2001 | Barnes et al. | |

OTHER PUBLICATIONS

Wendt, et al., "Fabrication of Diffractive Optical Elements for an Integrated Compact Optical Microelectromechanical System Laser Scanner," J. Vac. Sci. Technol. B 18(6), Nov./Dec. 2000, 3608–3611.

* cited by examiner

*Primary Examiner*—Mark Budd
(74) *Attorney, Agent, or Firm*—Kevin W. Bieg

(57) ABSTRACT

The present invention comprises a microelectromechanical positioner to achieve substantially translational positioning of a platform without rotational motion, thereby maintaining a constant angular orientation of the platform during movement. A linkage mechanism of the positioner can comprise parallelogram linkages to constrain the rotational motion of the platform. Such linkages further can comprise flexural hinges or other turning joints at the linkage pivots to eliminate the need for rubbing surfaces. A plurality of the linkage mechanisms can be used to enable translational motion of the platform with two degrees of freedom. A variety of means can be used to actuate the positioner. Independent actuation of the anchor links of the linkage mechanisms with rotary electrostatic actuators can be used to provide controlled translational movement of the platform.

13 Claims, 5 Drawing Sheets

APPARATUS TO POSITION A MICROELECTROMECHANICAL PLATFORM

STATEMENT OF GOVERNMENT INTEREST

This invention was made with Government support under contract no. DE-AC04-94AL85000 awarded by the U.S. Department of Energy to Sandia Corporation. The Government has certain rights in the invention.

BACKGROUND OF THE INVENTION

The present invention relates to microelectromechanical (MEM) positioning devices, and more particularly to a MEM positioning device that comprises parallelogram linkages to achieve substantially translational motion of a platform (i.e., motion in a single plane and without rotation).

Precise control of position and orientation is required for many types of m MEM device applications. An example of an application benefiting from such precise micropositioning is high-performance optical MEM laser scanner as disclosed by J. R. Wendt et al., *J. Vac. Sci. Technol.* B 18, 3608 (2000). In this laser scanner, a diffractive optical element is patterned on a polysilicon shuttle that is linearly translated in the plane of a substrate, thereby enabling scanning of an output laser beam. To maintain proper orientation of the diffractive optical element relative to the laser beam to be scanned, the shuttle must exhibit substantially translational motion. For the scanner disclosed by Wendt et al., linear translation was accomplished by a gear-driven rack, or by a reciprocating arm linked to a rotating gear. Other micropositioning MEM devices have been proposed to independently control the orthogonal movement of a stage in two dimensions (e.g., U.S. Pat. No. 5,962,949 to Dhuler). However, there remains a need for reliable, precise micropositioning of a platform in two orthogonal dimensions wherein orientation of the platform is maintained over a range of motion and rubbing surfaces are eliminated.

SUMMARY OF THE INVENTION

The present invention provides a MEM positioner, comprising a substrate, a moveable platform, and at least one linkage mechanism having a plurality of links, wherein the linkage mechanism is pivotably attached to the substrate by at least two anchor links and pivotably attached to the moveable platform by at least two platform links, and whereby the platform is constrained to exhibit substantially translational movement in a plane. The linkage mechanisms can be parallelogram linkages.

The MEM positioner can be actuated by a variety of means, including electrostatic, electromagnetic, piezoelectric, and thermal activation of the linkage mechanisms and/or the platform. Rotary actuation of one or more of the anchor links enables fixed location actuators and precise translational control of the platform position. Such actuation can be provided by rotary electrostatic actuators operatively connected to one or more of the anchor links.

The MEM positioner can be fabricated by a variety of device fabrication technologies generally known to those in the art, including sacrificial surface micromachining, bulk micromachining, and LIGA (LIGA is a German acronym that stands for lithography, electroplating, and molding). The MEM positioner can be formed on a silicon substrate by surface micromachining, using planar fabrication process steps known to the integrated circuit (IC) art. The platform can be formed of polycrystalline or single crystal silicon and can have a structure and properties modified for specialized applications, such as optical applications.

Advantages of the MEM positioner of the present invention include precision positioning of a moveable platform; no wear-induced change in performance, due to the absence of rubbing surfaces; inherent orientation stability due to the constrained system geometry; and extremely low hysteresis.

BRIEF DESCRIPTION OF THE DRAWINGS

The accompanying drawings, which are incorporated in and form part of the specification, illustrate the present invention and, together with the description, explain the invention. In the drawings, like elements are referred to by like numbers.

FIG. 2 shows a top view of a MEM positioner.

FIG. 3 shows a top view of a two-mechanism MEM positioner, comprising two orthogonal linkage mechanisms configured to achieve controlled translational motion of a platform.

FIG. 4 shows a top view of a four-mechanism MEM positioner.

DETAILED DESCRIPTION OF THE INVENTION

Linkages are mechanisms comprising a plurality of interconnected links to provide constrained kinematic motion. That is, movement of one of the links will cause the remaining links to move to prescribed, predictable positions. Linkages can be designed to produce various combinations of translational and rotational motion of a platform (i.e., a stage). Linkages are particularly useful for MEM device applications because they enable controlled motion of a suspended platform in a plane without requiring rolling or sliding motions that can cause wear and early device failure.

Figure 1:
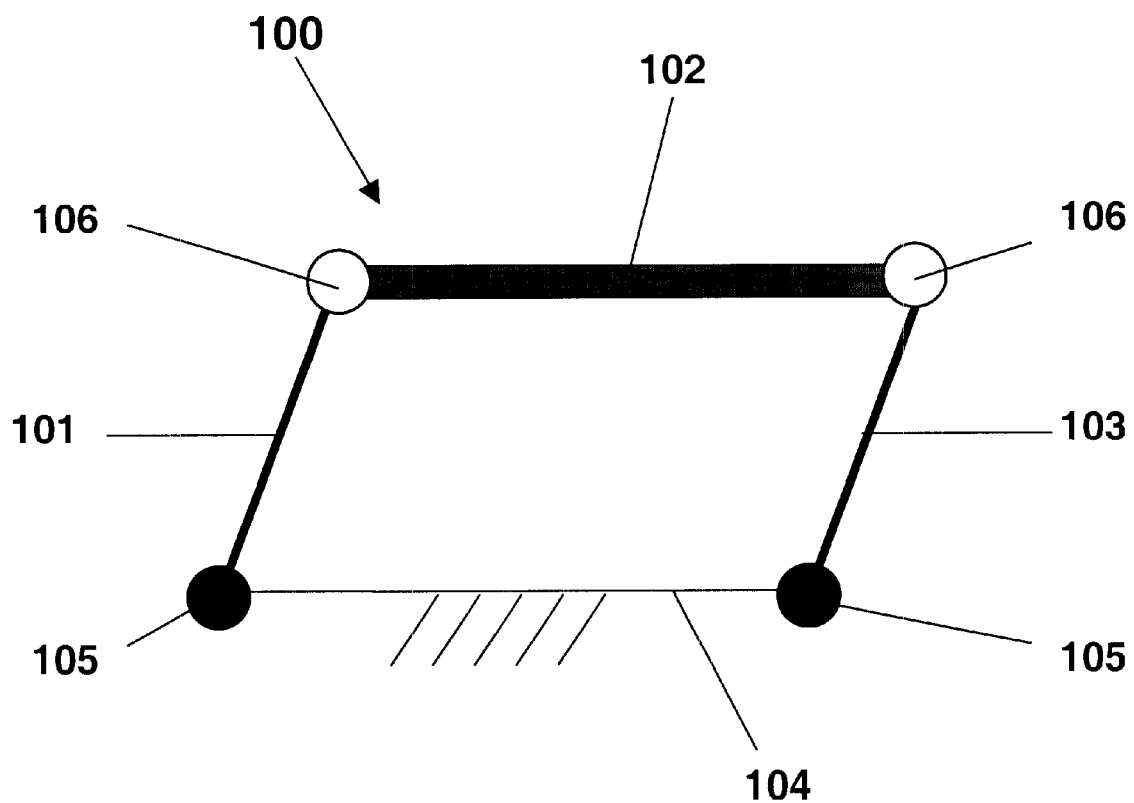
FIG. 1 shows a four-bar linkage to illustrate substantially translational motion.

One of the simplest and most useful linkages is the four-bar linkage 100, shown in FIG. 1. The four-bar linkage 100 comprises a plurality of moveable links denoted as a crank link 101, a coupler link 102, and a rocker link 103. The crank link 101 and the rocker link 103 are each anchored to a stationary substrate by a pivoting joint 105 thereby defining a fixed link 104. The crank link 101 and rocker link 103 are each attached at the other end thereof to the coupler link 102 by a pivoting joint 106. Depending on the relative length of the links, the various moveable links 101, 102, 103 can exhibit different types of motions relative to the fixed link 104. If the linkage 100 forms a parallelogram, such that the crank and rocker links 101, 103, respectively, are of equal length and the coupler link 102 is equal in length to the fixed link 104, then the coupler link 102 will be constrained to move parallel to the fixed link 104. In this case, the coupler link 102 will exhibit substantially translational motion relative to the fixed link 104 with a single degree of freedom.

Figure 2A:
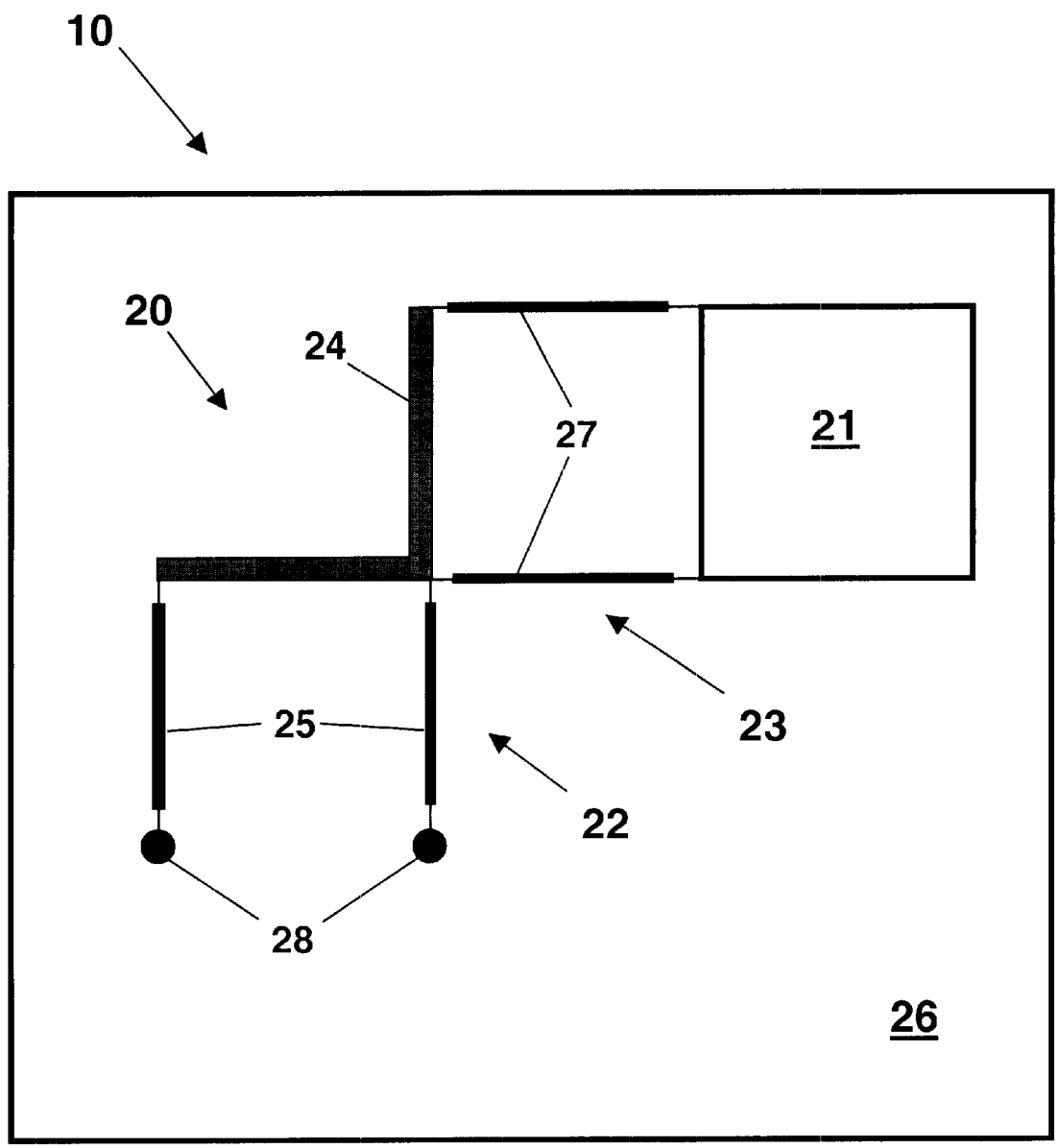
FIG. 2A shows a linkage mechanism having parallelogram linkages to achieve substantially translational motion of a platform.

According to the present invention, substantially translational motion can be used to move a MEM platform that must be constrained to move in a plane while maintaining a parallel condition relative to the underlying substrate. FIG. 2A schematically illustrates a first example of a MEM positioner 10 having a linkage mechanism 20 according to the present invention for achieving substantially translational motion of a MEM platform 21. The linkage mechanism 20 comprises two parallelogram linkages 22, 23 interconnected by a moveable frame 24. The moveable frame 24 can be a right-angle frame or can be any angle, so long as the linkages 22, 23 are parallelograms.

The anchor linkage 22 can have anchor links 25 of equal length, each anchor link 25 having a first end pivotally attached to the substrate 26 at fixed anchor pivots 28. The anchor pivots 28 can be flexible to torque applied in the plane of the substrate 26 and can be rigid to resist out-of-plane motions. The anchor pivots 28 can be pin joints, flexural hinges, or any joint type that provide pivoting motion of the anchor links 25. For example, flexural hinges resisting out-of-plane motion can be made by making the width of the link at the joint much less than its height. The opposite ends of the anchor links 25 can be likewise pivotably attached to the moveable frame 24 at frame pivots to form a coupler link. The anchor pivots 28 can be spaced at the same distance as the frame pivots. The anchor pivots 28 thereby define a fixed link having a length equal to the coupler link defined by the frame pivots. A four-bar parallelogram linkage is thereby formed, wherein the opposing links are of equal length. A platform linkage 23 can be similarly formed with a pair of platform links 27 connecting the platform 21 to the frame 24 with a flexible or rotatable attachment at platform and frame pivots. The platform pivots and frame pivots can be spaced equidistant, thereby forming a parallelogram platform linkage 23.

Because of the parallelogram geometry of the anchor linkage 22, the orientation of the frame 24 is constrained to remain parallel to anchor pivots 28 during movement. Similarly, because of the parallelogram geometry of the platform linkage 23, the platform 21 is constrained to maintain a parallel orientation to the right angle portion of frame 24 to which it is connected. Consequently, the platform 21 is constrained to move relative to the anchor pivots 28 without rotation. The platform 21 therefore exhibits substantially translational motion.

A variety of actuation means known to those skilled in the art, such as electrostatic, electromagnetic, piezoelectric, and thermal actuation, can be used to actuate the positioner 10. Translation of the moveable platform 21 in this example of the present invention can be achieved by any means whereby at least one actuator is operatively connected to the linkages 22, 23, the frame 24, or the platform 21. Regardless of the actuation means, the platform 21 is constrained to exhibit substantially translational motion without rotation due to the parallelogram linkages 22, 23.

Figure 2B:
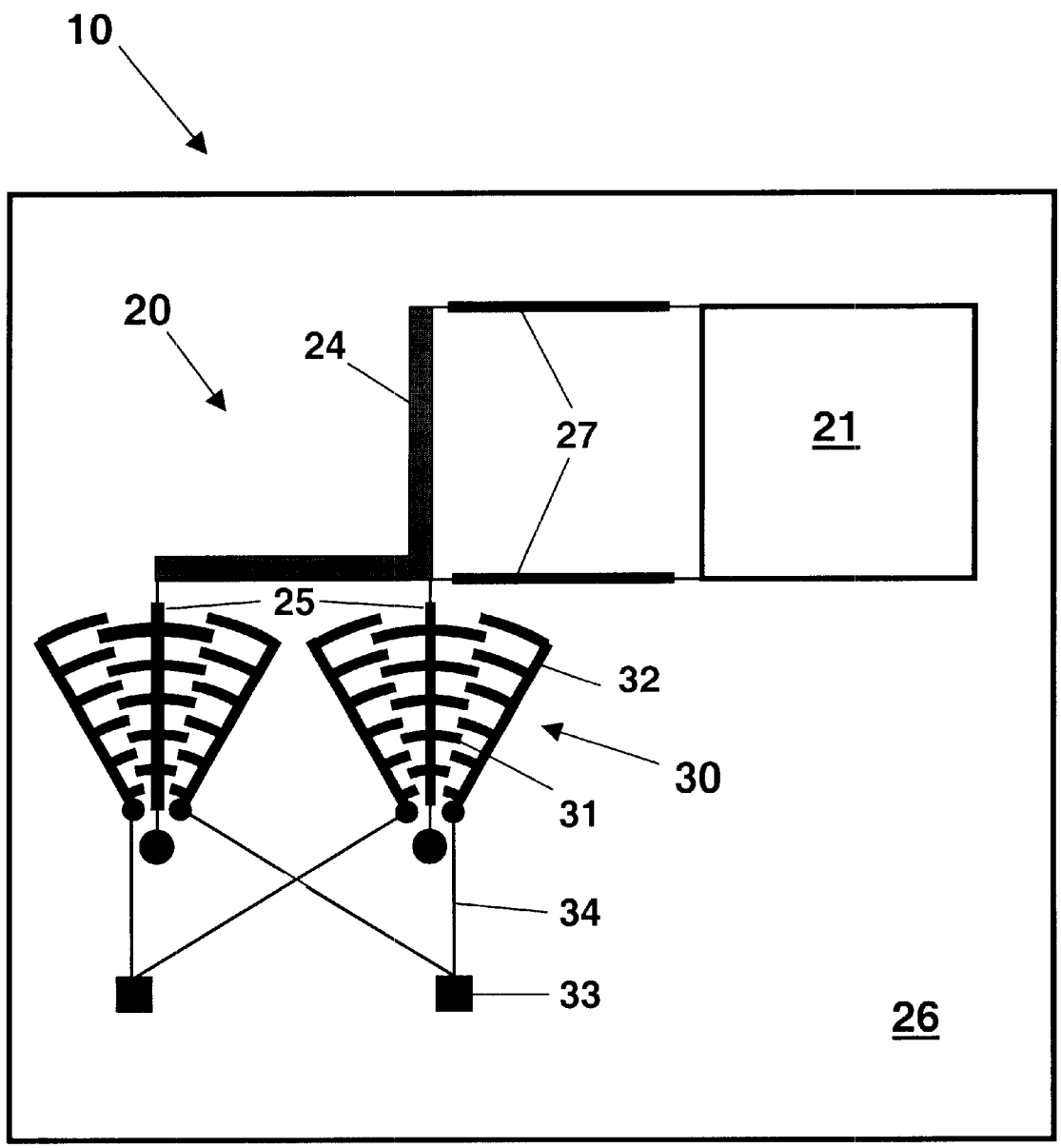
FIG. 2B shows the linkage mechanism with a pair of bidirectional rotary electrostatic actuators to actuate the anchor links of the linkage mechanism.

FIG. 2B shows a convenient means for actuating the linkage mechanism 20 comprising rotary actuation of the anchor links 25 about the anchor pivots 28. Rotary actuation enables the use of fixed location actuators to provide precise translational control of the platform 21 position. Rotary actuation can be achieved using rotary electrostatic actuators comprising electrostatic comb drives providing motion about an arc. A unidirectional rotary electrostatic actuator, comprising a stationary electrostatic arm and a moveable electrostatic arm oriented at an angle to each other, is disclosed in U.S. Pat. No. 6,211,599 to Barnes et al., which is incorporated herein by reference.

FIG. 2B shows an example of rotary actuation of the anchor links 25 of anchor linkage by means of bidirectional rotary electrostatic actuators 30 to control the positioning of the platform 21. Each bidirectional rotary electrostatic actuator 30 comprises a plurality of arcuate electrostatic fingers extending outward from the sides of the anchor links 25 to form a moveable electrostatic comb 31. A pair of stationary electrostatic combs 32 are located about the moveable electrostatic comb 31 with fingers of the stationary electrostatic combs 32 being interdigitated with the fingers of the moveable electrostatic comb 31. The individual fingers can be arcuate and can have a length that increases with distance away from the anchor pivots 28. The moveable electrostatic comb 31 is generally electrically grounded. The fingers of the moveable electrostatic comb 31 are urged into engagement with the interdigitated fingers of one or the other of the stationary electrostatic combs 32 in response to a voltage (e.g., 20–100 volts) applied to one of the stationary electrostatic combs 32 of each bidirectional rotary electrostatic actuator 30. Electrical connections can be made to the rotary electrostatic actuators 30 by contact pads 33 and wiring 34. The rotary electrostatic actuators 30 in FIG. 2B can be operated in tandem. The actuated anchor links 25 are thereby caused to move about the anchor pivots 28, causing the frame 24 to move in a path while maintaining substantially parallel orientation to the anchor pivots 28.

Other actuation means known to the art can also be used to vary the actuation force applied to the linkage mechanism 20. For example, a unidirectional electrostatic actuator fixed as in FIG. 2 but with only one stationary electrostatic comb 32 can be operatively connected to each anchor link 25 to provide motion thereto. The anchor links 25 can each have a spring (not shown) to restore the linkage mechanism 20 when the applied voltage is removed. Each electrostatic actuator 30 can further include one or more stops to prevent contact between the moveable and stationary electrostatic combs 31, 32 that could otherwise result in electrical short-circuiting. Furthermore, in some embodiments of the present invention, only one of the anchor links 25 need be activated, with the electrostatic combs 31, 32 of the other anchor link 25 being used to capacitively sense the position of the platform 21.

Figure 3A:
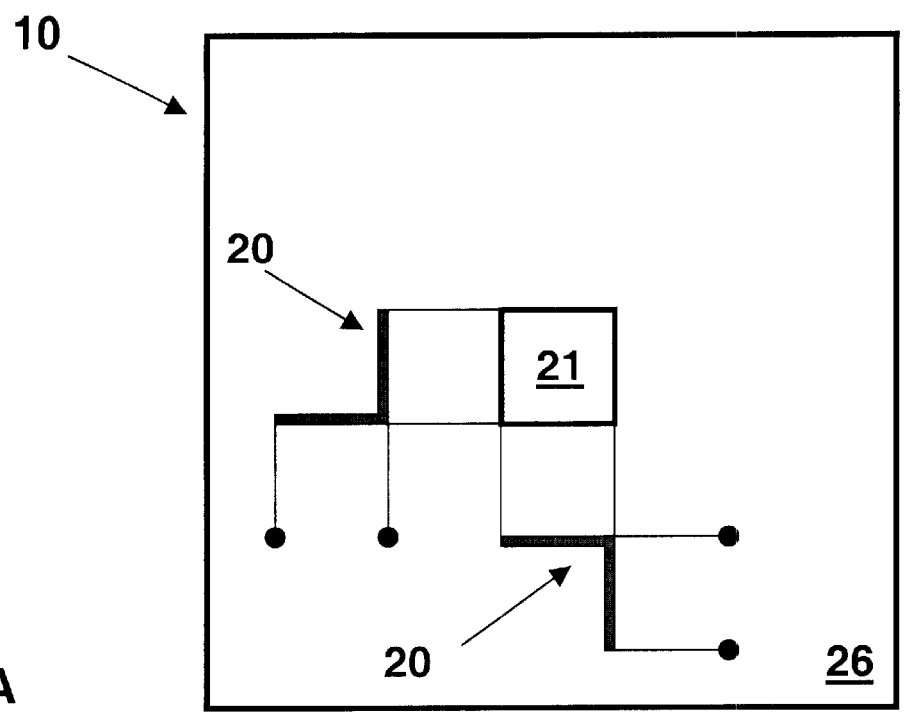
FIG. 3A shows the two-mechanism MEM positioner in an as-fabricated position.
Figure 3B:
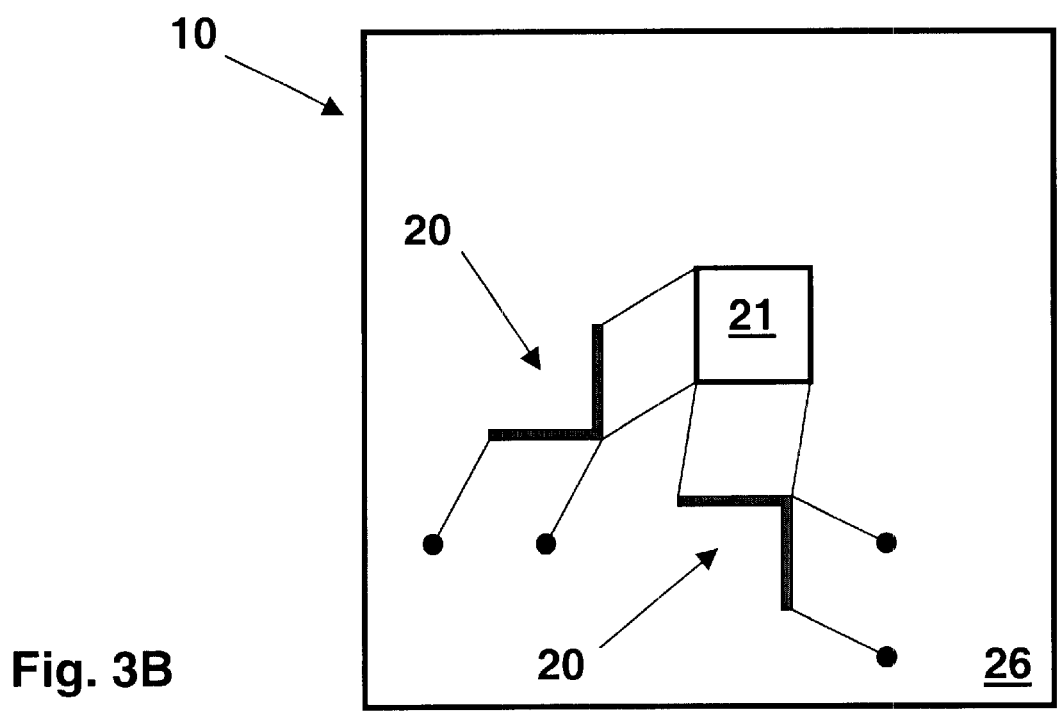
FIG. 3B shows the two-mechanism MEM positioner in a displaced position.

Activation of the anchor linkage 22 only, with the platform linkage 23 unactivated, will move the platform 21 with one degree of freedom in an arc about the anchor pivots 28 while maintaining its angular orientation. A pair of linkage mechanisms 20 can be oriented orthogonal to each other and connected to the platform 21 to provide two degrees of freedom. A second example of the MEM positioner 10 of the present invention comprising two linkage mechanisms 20 is shown in FIGS. 3A and 3B. FIG. 3A shows a MEM positioner 10, comprising two linkage mechanisms 20 and the platform 21, in the as-fabricated position. The two-mechanism positioner 10 can provide independent X-Y motion of the platform 21 in a plane parallel to the substrate 26, as indicated by the activated positioner 10 in FIG. 3B. As described above, activation of the positioner 10 can be achieved by activation of each of the linkage mechanisms 20, the platform 21, or the frame 24.

Figure 4A:
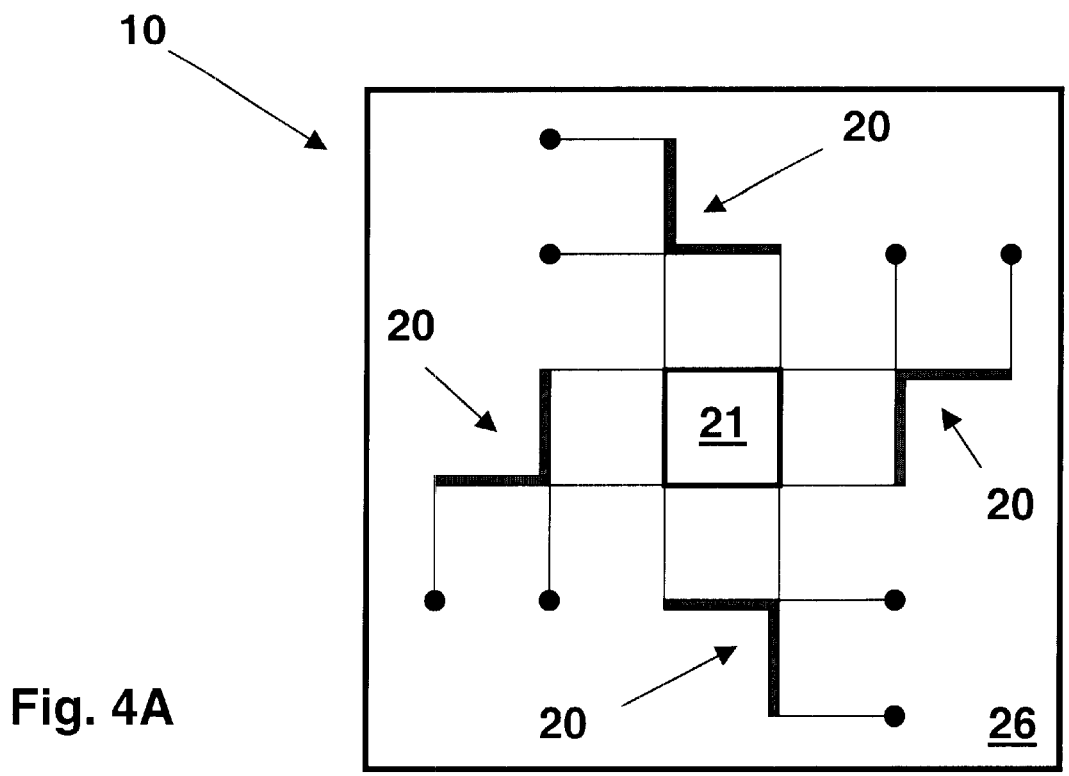
FIG. 4A shows the four-mechanism MEM positioner in an as-fabricated position.
Figure 4B:
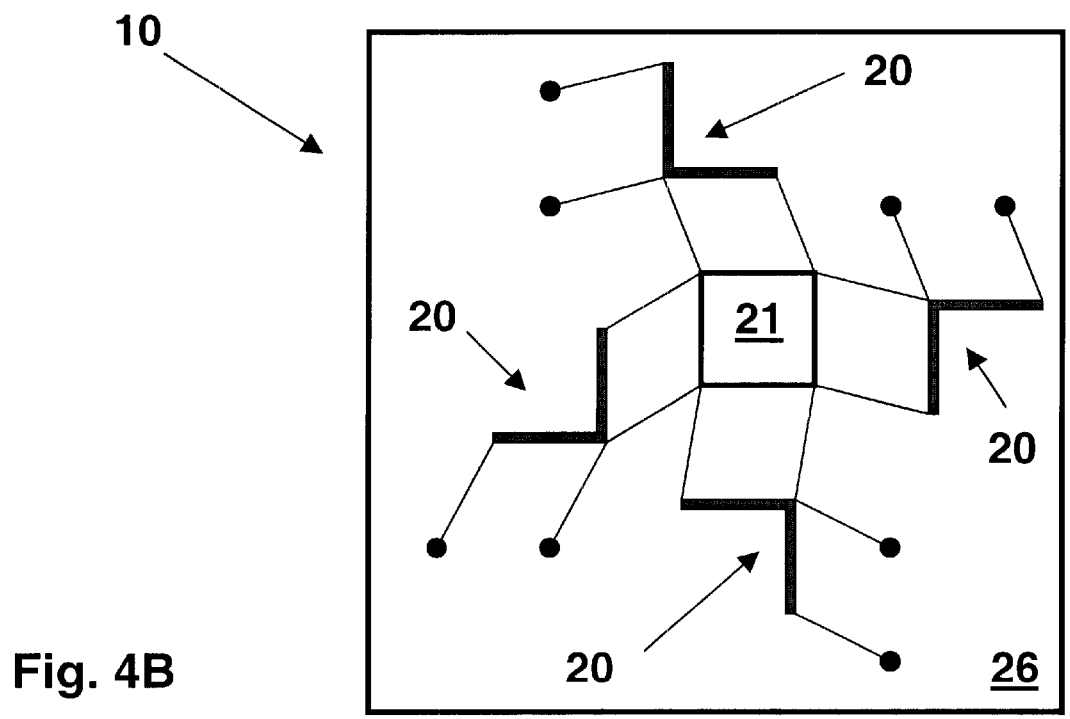
FIG. 4B shows the four-mechanism MEM positioner in a displaced position.

As shown by a third example of the present invention in FIG. 4, additional linkage mechanisms 20 can be added to further control the range of motion of the platform 21 and to achieve greater stability thereof. FIG. 4A shows an as-fabricated position of a four-mechanism MEM positioner 10. FIG. 4B shows a displaced position of the platform 21 after actuation of the various linkage mechanisms 20 of the four-mechanism positioner 10. The presence of the additional linkage mechanisms 20 can provide greater out-of-plane stiffness and can provide greater orientational stability.

Two degrees of freedom of translational motion can be achieved by actuating any two of the four linkage mechanisms 20 shown in FIGS. 4A and 4B. Actuation of additional linkage mechanisms 20 to deliver additional force to the positioner 10 can result in an increased rate at which the position of the platform 21 can be changed.

The platform 21 can be controlled to provide motion through any desired path, or through paths in orthogonal directions, by an open-loop controller or other control means. For example, the platform 21 can be controlled to scan in a linear direction and step in a direction perpendicular to the scanning direction, while maintaining orientation relative to the substrate 26. The range of motion can be determined by the range of motion of the pivoting joints, the length of the anchor links, and the length of the platform links. The range of motion can span distances that are as short as sub-micron to over 100 microns.

The two-dimensional motion of the platform 21 can exhibit multiple natural resonant frequencies and resonant modes that depend on parameters of the positioner 10 such as stiffness of pivoting joints, component geometries, and component masses. These resonances can be employed to achieve periodic motion of the platform 21. Periodic motion can be desirable for a variety of specialized applications, such as optical scanners.

For specialized applications, such as optics, the structure and properties of the platform 21 can be modified to alter the properties of electromagnetic radiation impinging thereon. Optical elements, such as a diffractive optical element, can be formed on or attached to the platform 21. The platform 21 can comprise single crystal silicon to improve the optical properties (e.g., by using a silicon-on-insulator substrate).

The MEM positioner 10 can be fabricated by a variety of MEM device fabrication technologies generally known to those in the art, including sacrificial surface micromachining, bulk micromachining, and LIGA (e.g., *Fundamentals of Microfabrication by Marc Madou*, CRC Press (1997); and U.S. Pat. No. 6,082,208 to Rodgers et al., which are incorporated herein by reference).

Surface micromachining can be used to fabricate the MEM positioner 10 using planar fabrication process steps known to those in the IC industry. The entire MEM positioner 10, including the actuation system, can be fabricated from a single mechanical level of polysilicon. It can also be fabricated from multiple levels of polysilicon. It is generally advantageous to create the structure to provide maximum vertical, or out of plane, stiffness. This is generally accomplished by using as many structural levels as are available for the elements of the structure where out of plane compliance can exist.

A silicon substrate 26 can be used for supporting the MEM positioner 10. Surface micromachining processes are based on repeated steps of depositing and photolithograpically patterning a plurality of alternating layers of low-stress polysilicon (also termed polysilicon) and a sacrificial material (e.g., silicon dioxide or a silicate glass) to build up the structure of the MEM positioner 10 layer by layer on the silicon substrate 26. Vias etched through the sacrificial layers at predetermined locations provide anchor points to the substrate and for mechanical and electrical interconnections between the various polysilicon layers. Functional elements of the MEM positioner 10 are built up layer by layer using a series of deposition and patterning steps. Typical in-plane lateral dimensions of the functional elements can range from one micron to several hundred microns or more, while individual layer thickness is typically about 1–3 microns. After the structure of the MEM positioner 10 is built up, it can be released for movement by removing the sacrificial material in part or entirely by exposure to a selective etchant comprising hydrofluoric acid (HF) in liquid or vapor form which does not substantially attack the polysilicon layers while etching away the sacrificial material. The released structure generally consists of a first layer of polysilicon that provides electrical interconnections (i.e., wiring) and/or a voltage reference plane (e.g., a ground plane) and up to three or more layers of mechanical polysilicon that can be stacked and interconnected to form the linkages 20, platform 21, and electrostatic actuators 30. The position of the platform 21 can be maintained during processing (including the release etch and post processing), by the inclusion of fuses (e.g. comprising polysilicon bridges) that hold the structure in place and can be removed by electrically blowing the fuses with an applied voltage to release the platform for movement.

Alternatively, one or more removable constraining clips can also be used to secure the platform 21 during fabrication. Because the entire process is based on standard IC fabrication technology, a large number of fully assembled MEM positioners 10 can be batch-fabricated on a silicon substrate without the need for piece-part assembly.

It will be understood that the above description is merely illustrative of the applications of the principles of the present invention, the scope of which is to be determined by the claims viewed in light of the specification. Other variants and modifications of the invention will be apparent to those of skill in the art.

What is claimed is:

1. A microelectromechanical positioner, comprising:
   a substrate;
   a moveable platform;
   at least one linkage mechanism having a plurality of links, wherein the linkage mechanism is pivotably attached to the substrate by at least two anchor links and pivotably attached to the moveable platform by at least two platform links, and whereby the platform is constrained to exhibit substantially translational movement in a plane; and
   at least one rotary actuator operatively connected to at least one anchor link to provide motion thereto.

2. A microelectromechanical positioner, comprising:
   a substrate;
   a moveable platform;
   at least one linkage mechanism having a plurality of links, wherein the linkage mechanism Is pivotably attached to the substrate by at least two anchor links and pivotably attached to the moveable platform by at least two platform links, and whereby the platform is constrained to exhibit substantially translational movement in a plane; and
   at least one actuator operatively connected to provide movement thereof to at least one of the group consisting of a linkage mechanism, an anchor link, a platform link, and the platform, wherein the at least one actuator selected is from the group consisting of electrostatic actuators, electromagnetic actuators, and thermal actuators.

3. The microelectromechanical positioner of claim 1 or 2, wherein each link of the linkage is pivotably attached to another link by a pin joint or flexural hinge.

4. The microelectromechanical positioner of claim 1 or 2, wherein the at least one linkage mechanism comprises a parallelogram linkage.

5. The microelectromechanical positioner of claim 1 or 2, wherein the substrate comprises silicon.

6. The microelectromechanical positioner of claim 1 or 2, wherein the platform comprises polycrystalline or monocrystalline silicon.

7. The microelectromechanical positioner of claim 1 or 2, wherein each linkage mechanism comprises polycrystalline silicon or silicon nitride.

8. The microelectromechanical positioner of claim 1, wherein the rotary actuator comprises an electrostatic actuator.

9. The microelectromechanical positioner of claim 1 or 2, further comprising at least one spring operatively connected to the platform to restore the platform to a rest position in the absence of actuation of the actuator.

10. The microelectromechanical positioner of claim 1 or 2, wherein the positioner exhibits at least one resonant frequency.

11. The microelectromechanical positioner of claim 1 or 2, wherein the platform exhibits at least one degree of freedom of motion.

12. The microelectromechanical positioner of claim 1 or 2, wherein the platform alters the properties of electromagnetic energy impinging thereon.

13. The microelectromechanical positioner of claim 1 or 2, wherein the movement of the platform is controlled with an open-loop controller.

* * * * *